(12) United States Patent
Dallmeier

(10) Patent No.: US 9,332,209 B2
(45) Date of Patent: May 3, 2016

(54) BACKING UP COMPRESSED DATA AT THE SOURCE BEFORE TRANSMITTING OVER A NETWORK

(75) Inventor: Dieter Dallmeier, Pettendorf (DE)

(73) Assignee: Dallmeier electronic GmbH & Co. KG, Regensburg (DE)

( * ) Notice: Subject to any disclaimer, the term of this patent is extended or adjusted under 35 U.S.C. 154(b) by 1667 days.

(21) Appl. No.: 12/583,610

(22) Filed: Aug. 24, 2009

(65) Prior Publication Data

US 2010/0073517 A1 Mar. 25, 2010

(30) Foreign Application Priority Data

Sep. 19, 2008 (DE) .................. 20 2008 012 473 U
Jun. 5, 2009 (DE) ...................... 10 2009 023 997

(51) Int. Cl.
| | |
|---|---|
| *H04N 7/18* | (2006.01) |
| *H04N 5/77* | (2006.01) |
| *H04N 5/781* | (2006.01) |
| *H04N 21/4147* | (2011.01) |
| *H04N 21/4223* | (2011.01) |
| *H04N 21/426* | (2011.01) |

(52) U.S. Cl.
CPC ............ *H04N 5/77* (2013.01); *H04N 5/781* (2013.01); *H04N 7/181* (2013.01); *H04N 21/4147* (2013.01); *H04N 21/4223* (2013.01); *H04N 21/42661* (2013.01)

(58) Field of Classification Search
CPC .................................................. H04N 5/77
USPC .................... 348/211.11, 153, 159, 231.4
See application file for complete search history.

(56) References Cited

U.S. PATENT DOCUMENTS

| | | | | |
|---|---|---|---|---|
| 5,553,609 | A | * | 9/1996 | Chen et al. ................... 600/301 |
| 6,253,064 | B1 | * | 6/2001 | Monroe ....................... 455/66.1 |
| 6,591,068 | B1 | * | 7/2003 | Dietz ............................ 396/429 |
| 6,996,275 | B2 | * | 2/2006 | Edanami ...................... 382/218 |
| 2001/0005449 | A1 | | 6/2001 | Obara ........................... 386/109 |
| 2003/0058934 | A1 | * | 3/2003 | Koto et al. .............. 375/240.01 |
| 2003/0169335 | A1 | * | 9/2003 | Monroe ........................ 348/143 |
| 2004/0012686 | A1 | * | 1/2004 | Ono et al. ............... 348/211.99 |
| 2004/0250288 | A1 | | 12/2004 | Palmerio ....................... 725/105 |
| 2005/0094578 | A1 | * | 5/2005 | Pasha et al. ................... 370/260 |
| 2006/0136972 | A1 | * | 6/2006 | Metzger et al. .............. 725/105 |

(Continued)

FOREIGN PATENT DOCUMENTS

| | | |
|---|---|---|
| EP | 1367314 A2 | 12/2003 |
| EP | 1720111 A1 | 11/2006 |
| GB | 2442503 A | 4/2007 |

OTHER PUBLICATIONS

European Search Report dated Sep. 21, 2011 for counterpart European application EP09010743.4 (6 pages).

*Primary Examiner* — Usman Khan
(74) *Attorney, Agent, or Firm* — Imperium Patent Works; Darien K. Wallace

(57) ABSTRACT

An image and/or audio data processing and storage system includes a monitoring system and a plurality of cameras connected thereto. The image and/or audio data processing and storage system contains n units that are independent of each other, with each of the units having a data processing device containing a first segment that compresses digital image and/or audio data as well as a first storage device and a second storage device that are fed the same image and/or audio data compressed by the data processing device for storage.

14 Claims, 2 Drawing Sheets

(56) References Cited

U.S. PATENT DOCUMENTS

2007/0091177 A1    4/2007  West et al.
2007/0116429 A1*   5/2007  Tsuchida et al. ............... 386/83
2007/0157013 A1*   7/2007  Park ................................. 713/1
2007/0217143 A1*   9/2007  Wagatsuma et al. .......... 361/685
2008/0126715 A1    5/2008  Fujie et al. .................... 711/154

* cited by examiner

BACKING UP COMPRESSED DATA AT THE SOURCE BEFORE TRANSMITTING OVER A NETWORK

CROSS REFERENCE TO RELATED APPLICATION

This application is based on and hereby claims the benefit under 35 U.S.C. §119 from German Patent Application No. DE 202008012473.5, filed on Sep. 19, 2008, in the German Patent Office, and from German Patent Application No. DE 102009023997.9-53, file on Jun. 5, 2009, in the German Patent Office. The contents of both of these patent documents are incorporated herein by reference. This application is a continuation-in-part of both German Patent Application No. DE 202008012473.5 and German Patent Application No. DE 102009023997.9-53.

TECHNICAL FIELD

The present invention relates to an image and audio data processing and storage system, as well as to a monitoring system connected to a plurality of cameras that contains the image and audio data processing and storage system.

BACKGROUND

Conventional monitoring systems and devices that record and store one or several scenes commonly contain a plurality of cameras that provide image data and, if a microphone is present, audio data of the scenes. For example, FIG. 1 shows a plurality of cameras 30 that record the goings-on at a location frequented by many people. If analog cameras are used to record the images and/or sound, the cameras 30 are each connected to an analog-to-digital converter 22, with a coder 24 for data compression being arranged downstream. If a digital camera is used, the cameras 30 are each directly connected to the coder 24. Each camera 30, optional A/D converter 22 and coder 24 together form one channel of a multitude of n channels, with n being a whole number greater than or equal to 2. To this effect, the camera, A/D converter and coder are controlled and actuated by a controller. The compressed image and/or audio data of the n channels are fed via a network 40, for example a local network (LAN, Local Area Network), into a central storage device that is actuated by a controller for the management of the data fed into it and that has a multitude of hard drives to store the data. The overall capacity of the storage device 50 lies within the range of several terabytes for about thirty channels.

In known monitoring systems, the controller allocated to the storage device provides for a relatively efficient utilization of the available storage space, with provisions being made to a limited degree for loss of data in the event of a defect or malfunctioning of smaller storage areas. For example, if one of the hard drives fails, the redundant storage management of the controller is capable of compensating the attendant data loss at least partially. But at a minimum, the loss of a large portion of the data that were stored so far can be prevented, and the intended operation of the storage device can be maintained. However, preventing the loss of the data stored so far and maintaining the operation of the storage device is possible only after carrying out a reorganization of the storage device by the controller itself, which results in no or very few data being able to be stored due to the increased load. As far as the avoidance of any loss of data and maintaining the intended operation are concerned, the storage device is subject to very narrow limits. If, for example, two hard drives of the storage device fail, the controller can no longer carry out a successful reorganization of the storage device due to the amount of data that are no longer accessible by it.

In addition to that, the network 40 is susceptible to defects as well. The network defects may result in image and/or audio data, which was fed error-free into the network, appearing at the network's output delayed, distorted or not at all. Thus, a system for processing, monitoring and storing multi-channel image and/or audio data is sought that exhibits increased operational reliability as compared to known image processing systems.

SUMMARY

An image and/or audio data processing and storage system has n units that are independent of each other, with n being an integer greater than or equal to two. Each of the units has a data processing device and two storage devices. Each data processing device includes a first segment that compresses digital image and/or audio data. The compressed digital image and/or audio data provided by the data processing device is fed into a first storage device and a second storage device. Each unit thus forms an independent channel into which separate data are fed, compressed and stored. Following compression, the data fed into each unit are stored by the first and second storage devices and are thus available in duplicate following compression. If one of the storage devices fails, the data stored until then can still be recalled from the other storage device, which can also store future data. Moreover, even if the other storage device of the unit in question fails as well, only the data of the one channel will be affected since the data fed, processed and stored via the other channels are treated separately in other channels or units. Thus, on the one hand, the danger is minimized that image and/or audio data fed into the image and/or audio data processing and storage device are lost, and on the other hand, the intended operation of the image and/or audio data processing and storage device is maintained as a whole even after one or several units or, respectively, channels fail.

Furthermore, a monitoring system is provided with n cameras for recording image and audio data of one or several scenes, with n being a natural number greater than or equal to two. A corresponding image and audio data processing and storage system has n units that are independent of each other. Each of the units contains a data processing device that contains a first segment that compresses digital image and audio data as well as storage devices into which the compressed data are fed. The compressed image and/or audio data provided by the data processing device are fed for storage into a first storage device segment and a second storage device segment. In this arrangement, the cameras are allocated to only one of the units and transmit the recorded image and/or audio data to the unit allocated to them. This creates an n-channel monitoring system that has the same advantages as those that result from the image and/or audio data processing and storage system described above. In addition to that, no network is required to transmit data between the data processing device and the storage devices of a channel, thereby increasing operational reliability even further.

The continued developments described in the following relate to the image and/or audio data processing and storage system as well as to the monitoring system that are designated here simply as the "system". The data processing device of each unit contains a second segment that is connected upstream to the first segment and that digitalizes analog image and/or audio data. Thus, alternatively, not only digital but also analog image and/or audio data can be processed and stored.

The first storage device and the second storage device of each unit are each designed as a hard drive, thereby providing a reliable and cost-effective storage medium. Each unit has an error detecting device that records and displays any faulty functioning of the first and/or second storage devices. It is thus possible easily to recognize any faulty component of the system and to replace it with a functioning component.

Furthermore, each unit is equipped with an image and/or audio data output device that is configured in such a way that image and/or audio data fed to the unit at any given moment are outputted externally in real time, or that image and/or audio data already stored in the first or second storage devices are outputted externally at any point in time via a connection. Thus, the processed and stored data can be inputted into a network without the data being impacted by any malfunctions occurring within the network.

Replacing a defective unit is made easier by the fact that each unit is designed in the same way in the form of a blade, with the units being arranged in a rack, in particular in a 19-inch rack. An electric power supply device has two parts that are configured in such a way that both parts can jointly supply the device with electric current, but also that each part can supply the device with electric current by itself. This increases operational reliability even further. The electric power supply of the cameras is provided in a simple manner by the electric power supply device that feeds the current supplied by it into the respective camera via the unit allocated to it.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
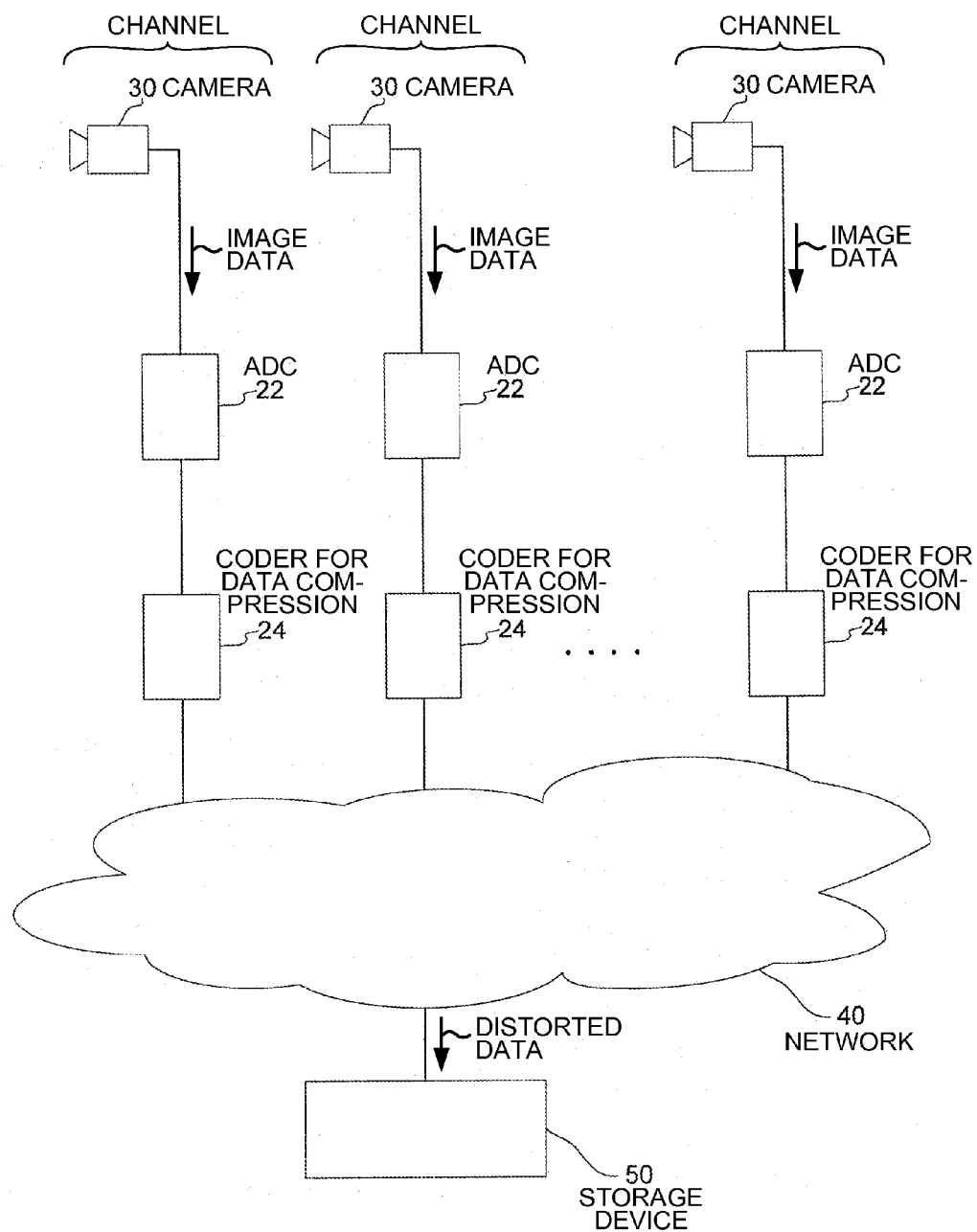
FIG. 1 (prior art) is a schematic diagram of a conventional n-channel monitoring system.
Figure 2:
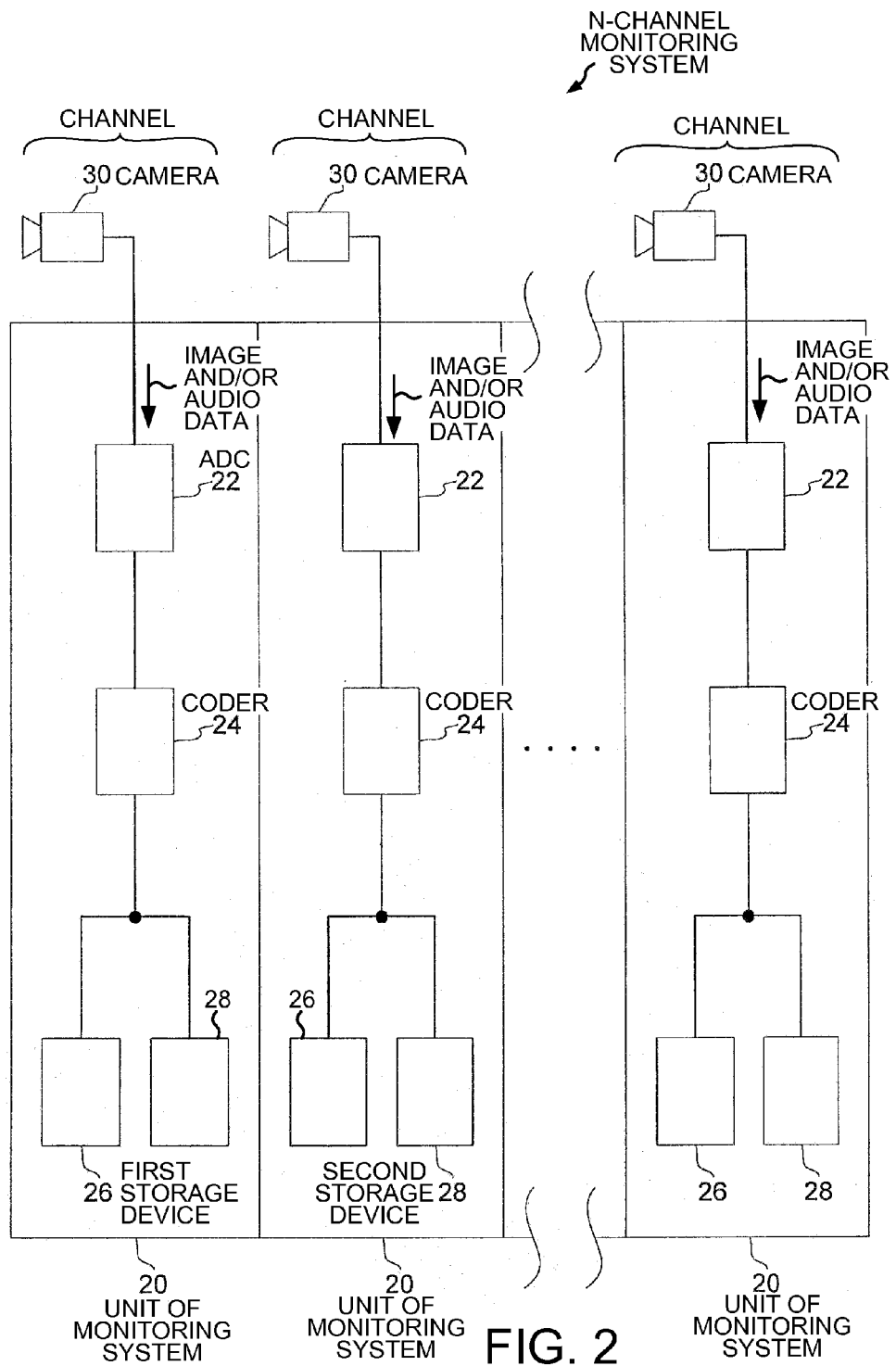
FIG. 2 is a schematic diagram of an n-channel monitoring system of a preferred embodiment of the present invention.

FIG. 2 shows an n-channel monitoring system that includes an image and/or audio data processing and storage system formed by n units 20 and an analog camera 30 connected to each of the n units, wherein n is an integer equal to or greater than two. For the preferred embodiment, n has a value of thirty. The monitoring system serves the supervision of a "hot spot", for example a traffic junction or a location frequented by many pedestrians, with up to n cameras being suitably positioned at the location to be monitored.

The cameras each have an image and/or audio section with the aid of which successive events at the location and in its surroundings can be recorded visually and/or acoustically. In this context, a recording of events solely on an acoustic basis is thinkable, albeit unusual. Where solely acoustic recordings are made, the cameras are replaced by microphones. The cameras are connected to the n-channel image and audio data processing and storage system via shielded cables whose length should be as short as possible in order to minimize any perturbations, with the system being formed by n independent units 20 with regard to the processing and storage of data.

The respective units 20 contain at their input a data processing device composed of a first segment 24, a coder, and, optionally, a second segment 22, an analog-to-digital converter. Here, the second segment 22 and the first segment 24 are connected in series, with the second segment being upstream of the first segment. The output of the first segment 24 is connected to the input of a parallel circuit composed of a first storage device 26 and a second storage device 28. FIG. 2 shows only a functional diagram of the system of the invention. Additional components of the invention that supply the components already referred to with electric current or that ensure the intended operation, in particular their coordination, have been omitted in FIG. 2 for reasons of clarity. Moreover, one of ordinary skill in the art will be capable, based on his technical know how, to provide the concrete circuiting or, respectively, wiring of the components after learning their function described below.

The following is a schematic description of how data are processed and stored by each channel. In the event that analog data should be involved, the image and/or audio data recorded by each camera of a channel are fed to the second segment 22, which performs an analog-to-digital conversion of the data fed into it. Should the camera involve a digital camera whose emitted data are already available in digital form, the second segment may be omitted or, respectively, bypassed. The first segment 24 downstream of the second segment 22 is a coder that compresses the image and/or audio data fed into it, thereby reducing the quantity of the data to be processed further. The image and/or audio data compressed by the first segment 24 are fed into a first storage device 26 as well as into a second storage device 28 that are designed, for example, as hard drives (HDD, hard disk drive) with a capacity of 250 G-bytes, 500 G-bytes or 750 G-bytes. Storage of the data on the first and second storage devices 26, 28 occurs in real time and almost simultaneously. In this context, processing and storage of the data of the channel occurs under the control of one or several controllers (not shown) that ensure the intended functioning and coordination of the components 22, 24, 26 and 28. Control of the cameras 30 may also occur under the guidance of a controller.

The controller or controllers provided for each unit 20 periodically review the functionality of the respective first and second storage devices 26, 28 and produce an optical and/or acoustical alert in the event that a defect or a failure of one or both storage devices of a unit 20 of the respective channel is detected.

An output unit provided for each channel or unit 20 ensures that not only the digitalized and compressed data fed momentarily to the respective unit but also the data already stored in devices 26, 28 are transmitted to an output connection (not shown). The output unit is controlled by the controller. The output data are in turn transferred from the output connection to a network such as a LAN or a global network such as the Internet so that the image and/or audio data recorded in real time or already stored can be transmitted separate from each other to any location for evaluation.

The respective units 20 are designed uniformly in the form of a blade so that they can be easily replaced in the event of failure. In particular, it is advantageous to arrange the units in their totality in a rack, particularly a 19-inch rack. The rack is equipped with a back blade that provides the system with a redundant power source. To this end, the electric current supply contains two parts that can supply the system with sufficient electric current either jointly during normal operation (alternating under full load or simultaneously under half load) or alone in the event of the failure of one part. The two parts of the power supply provide not only the units 20 but also the cameras 30 connected with each unit with electric current via the connecting cable provided between them.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An apparatus, comprising:
   a first unit that receives in real time first image data acquired by a first camera; and
   a second unit independent of the first unit, wherein the second unit receives in real time second image data acquired by a second camera, wherein each of the first unit and the second unit has a data processing device that includes a first segment, a first storage device and a second storage device, wherein the first segment compresses digital image data, and wherein each of the first storage device and the second storage device receives and stores the same compressed digital image data from the first segment.

2. The apparatus of claim 1, wherein the first segment compresses digital audio data.

3. The apparatus of claim 1, wherein the data processing device of each of the first unit and second unit includes a second segment located upstream of the first segment, and wherein the second segment digitizes analog image data.

4. The apparatus of claim 1, wherein each of the first storage device and the second storage device is a hard drive.

5. The apparatus of claim 1, wherein the second unit includes an error detecting device that detects and displays a defective functioning of the first storage device and the second storage device.

6. The apparatus of claim 1, wherein the first unit includes an image data output unit that separately outputs the first image data recorded by the first camera in real time and the image data already stored in the first storage device and in the second storage device.

7. The apparatus of claim 1, wherein the first unit and the second unit are uniformly designed in the form of a blade, wherein the first unit and the second unit are arranged in a rack.

8. The apparatus of claim 1, wherein an electric current supply unit has two parts, wherein each part can supply the first unit with electric current by itself, and wherein the two parts can jointly supply the first unit with electric current.

9. The apparatus of claim 1, wherein the second camera is supplied with electric current through the second unit.

10. An apparatus, comprising:
    a first image data processing and storage system;
    a second image data processing and storage system that is independent of the first image data processing and storage system;
    a first camera connected to the first image data processing and storage system; and
    a second camera connected to the second image data processing and storage system, wherein each of the processing and storage systems is connected to only one camera, wherein image data recorded by each camera is transmitted to only one processing and storage system, and wherein each of the processing and storage systems comprises:
    a data processing device that outputs compressed digital image data;
    a first storage device that receives and stores the compressed digital image data; and
    a second storage device that receives and stores the compressed digital image data.

11. The apparatus of claim 10, wherein the first camera includes a microphone that records audio data, and wherein the audio data recorded by the first camera is transmitted to the first image data processing and storage system.

12. The apparatus of claim 10, wherein all of the image data processing and storage systems are uniformly designed in the form of a blade, wherein the first and second image data processing and storage systems are arranged in a rack.

13. The apparatus of claim 10, wherein no network transmits the compressed digital image data received by the first and second storage devices.

14. The apparatus of claim 1, wherein the compressed digital image data received by the first and second storage devices is not transmitted via a network between the first segment and the first and second storage devices.

* * * * *